(12) United States Patent
Hattori et al.

(10) Patent No.: US 8,899,204 B2
(45) Date of Patent: Dec. 2, 2014

(54) ENGINE STARTING APPARATUS FOR IDLE-STOP VEHICLE

(75) Inventors: Motoyuki Hattori, Atsugi (JP); Masaya Furushou, Yokohama (JP); Kimiyoshi Nishizawa, Yokohama (JP); Yoshihiro Nakajima, Kamakura (JP); Atsushi Tadaki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 142 days.

(21) Appl. No.: 13/809,655

(22) PCT Filed: Jun. 29, 2011

(86) PCT No.: PCT/JP2011/064880
§ 371 (c)(1),
(2), (4) Date: Jan. 11, 2013

(87) PCT Pub. No.: WO2012/008305
PCT Pub. Date: Jan. 19, 2012

(65) Prior Publication Data
US 2013/0112165 A1    May 9, 2013

(30) Foreign Application Priority Data

Jul. 12, 2010  (JP) ................. 2010-157500

(51) Int. Cl.
*F02N 11/08*    (2006.01)
*F02N 15/00*    (2006.01)

(52) U.S. Cl.
CPC ............. *F02N 15/00* (2013.01); *F02N 11/0814* (2013.01); *F02N 11/0862* (2013.01); *F02N 2250/02* (2013.01)

USPC ............. 123/179.4; 123/179.25; 174/69; 174/74 A; 29/868

(58) Field of Classification Search
CPC ... H01B 7/06; F02N 11/0814; F02N 11/0803; F02N 11/0825; F02N 11/0859; F02N 2011/0881
USPC ............. 123/179.4, 179.25; 174/69, 72 A
See application file for complete search history.

(56) References Cited

U.S. PATENT DOCUMENTS

| 2004/0159297 A1* | 8/2004 | Kataoka et al. | ............. 123/179.4 |
| 2005/0126815 A1* | 6/2005 | Agnew | ............. 174/72 A |

(Continued)

FOREIGN PATENT DOCUMENTS

| JP | 2004-308645 A | 11/2004 |
| JP | 2008-37135 A | 2/2008 |
| JP | 2010-273477 A | 12/2010 |

(Continued)

*Primary Examiner* — Erick Solis
(74) *Attorney, Agent, or Firm* — Foley & Lardner LLP

(57) ABSTRACT

The total length of starter harness 7 for exclusive use for connecting a starter for an engine and plus-side terminal 4a of in-vehicle battery 4 is increased by providing a surplus redundant segment 21 to increase resistance in harness 7 beyond length required for laying the harness in an engine room. Redundant segment 21 is collected in a form of rod by forming a two-fold portion by folding a portion of the single continuous harness 7, and further folding the two-fold portion twice, and fixed through harness holder 23 to bracket 22 of battery tray 25. Without using a resistor receiving limitation of the heat resistance, it is possible to suppress a voltage drop at the time of restart, problematical in a vehicle having an idle-stop function. A required resistance is obtained by increasing the length redundantly, so that a temperature increase of harness 7 is small.

9 Claims, 5 Drawing Sheets

(56) References Cited

U.S. PATENT DOCUMENTS

2007/0063597 A1* 3/2007 Nito .......................... 310/68 C
2008/0283012 A1* 11/2008 Wanner ................... 123/179.25
2010/0251853 A1* 10/2010 Usami et al. ................... 74/7 C
2010/0294563 A1 11/2010 Yamashita

FOREIGN PATENT DOCUMENTS

JP 2011-47369 A 3/2011

* cited by examiner (a)

(b)

(c)

(a)　　　　(b)　　　　(c)

ENGINE STARTING APPARATUS FOR IDLE-STOP VEHICLE

TECHNICAL FIELD

The present invention relates to an engine starting apparatus for an engine provided with a starter driven by an in-vehicle battery, and more specifically to an engine starting apparatus in a vehicle provided with an idle-stop function to stop and restart an engine automatically according to a predetermined condition.

BACKGROUND ART

In general, a vehicular engine is provided with a starter having therein a dc motor and its switching mechanism. In many cases, this starter and an in-vehicle battery are connected together by a dedicated wiring, that is, a harness dedicated to this purpose. To restrain electric power loss, this harness is made as short as possible, and constructed to decrease the overall resistance including contact resistance as much as possible.

At the same time, there is known a vehicle having an idle stop function to stop an engine automatically at the time of a stop of the vehicle at a street crossing, for example, and to restart the engine automatically in accordance with brake release and/or accelerator pedal depression.

In the vehicle equipped with such an idle stop function, the battery voltage tends to drop frequently during operation of the vehicle due to inrush current of the starter motor, and the voltage drop might exert adverse influence on other electrical components and electronic equipment (an in-vehicle navigation system, for example). Therefore, there is proposed a technique to restrain the voltage drop due to the inrush current by inserting a resistor in series with the starter motor, as in a patent document 1.

However, the inrush current of the starter motor is very high at the level of several hundred amperes. Therefore, when an ordinary resistor is interposed in a circuit of the starter motor, the resistor tends to be heated to high temperatures and cause a problem concerning heat resisting property. Moreover, to avoid such heat generation, there is provided, in the patent document 1, a relay to short-circuit the resistor, and the system is arranged to supply current to the starter motor through the resistor only for a short time at an initial stage. However, in this case, the construction is complicated.

Furthermore, when the resistor is heated by repetition of the restart, the supply of current through the resistor even for a short period of time is unfeasible, and hence the system has to short-circuit the resistor, so that the system is unable to restrain the voltage drop.

PRIOR ART LITERATURE

Patent Document(s)

Patent Document 1: JP2004-308645 A

SUMMARY OF THE INVENTION

In a vehicle provided with an idle-stop function to stop an engine and restart the engine through a starter automatically in conformity with a predetermined condition or conditions, an engine starting apparatus according to the present invention, comprises a starter harness arranged or laid to connect an terminal of an in-vehicle battery to be mounted in the vehicle, and the starter directly, the starter harness including, or being provided with, a redundant segment which increases a resistance. With the redundant segment, the total harness length is increased beyond a harness length required for laying the starter harness. The redundant segment is put together in a collected form or lump or bundle by folding back a portion of the single continuous starter harness.

The resistance of the harness made of conducting material such as copper increases in proportion to the length of the harness. According to the present invention, the engine starting apparatus is arranged to restrain the inrush current at the time of start of the starter motor and hence restrain the voltage drop due to the inrush current, by additionally increasing the length of the harness connecting the terminal of the battery to be mounted on the vehicle and the starter directly.

Thus, the redundant segment in the form of a surplus length of the harness can be formed by folding a portion of the single continuous harness and collecting the folded portion.

The addition of a resistance of about several mΩ is sufficiently effective for restraining the voltage decrease at the time of restart. The resistance of such a magnitude can be achieved by increasing the total length of the harness.

According to the present invention, it is possible to restrain or prevent the voltage drop securely at the time of restart, readily with a simple construction without using another resistor, and hence without receiving limitation of the heat resistance of an ordinary resistor. Moreover, according to the present invention, the required resistance is achieved by increasing the total length of the harness redundantly, instead of increasing the resistance per unit length of the harness (reducing the cross sectional area of the conductor, for example). Therefore, it is possible to reduce the quantity of heat generated per unit length of the harness, and it is possible to set the conductor cross sectional area greater when the material of the conductor is the same. Therefore, advantage is obtained in respect of the heat mass of the conductor, and the harness 7 is not heated to an excessively high temperature in the engine room.

MODE(S) FOR CARRYING OUT THE INVENTION

Following is detailed explanation on one embodiment of the present invention with reference to the drawings.

Figure 1:
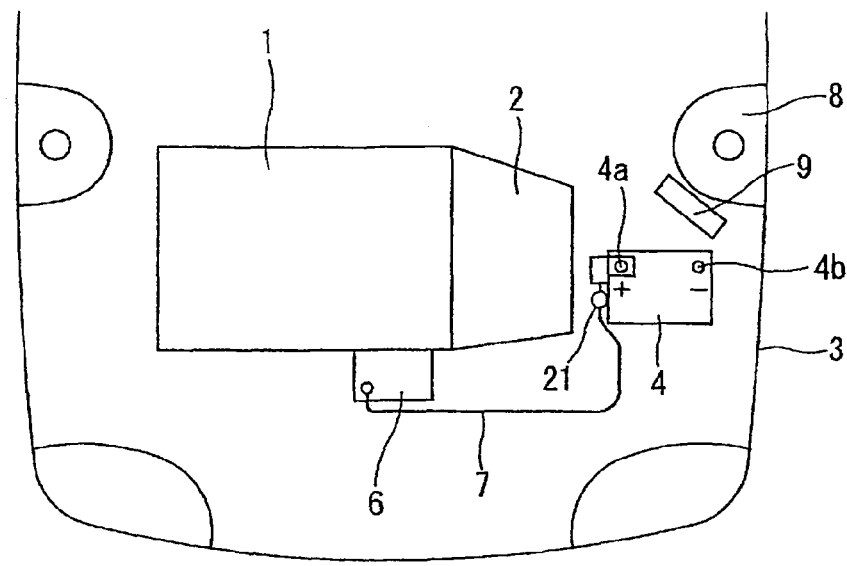
FIG. 1 is a schematic plan view of an engine room of a motor vehicle to which the present invention is applied.

FIG. 1 is a schematic plan view of an engine room or compartment of a motor vehicle to which the present invention is applied. The downward direction in FIG. 1 is the forward direction toward the front of the vehicle. As shown in FIG. 1, an engine 1 and a transmission 2 are mounted in a transverse layout. Between the transmission 2 and a fender portion 3 of the vehicle body on a lateral side, there is disposed a battery 4 shaped like a box. For example, the battery 4 is a lead battery having a rated voltage of 12.6V. As mentioned later, a battery tray 5 for supporting battery 4 is mounted on the vehicle body, and the battery 4 is fixedly mounted on battery tray 5. Battery 4 includes a plus-side or positive terminal 4a and a minus-side or negative terminal 4b in both end portions, respectively. The plus-side terminal 4a of battery 4 is connected with an input terminal 6a of a starter 6 provided at a side of the engine (the side facing the front of the vehicle), directly by a starter harness 7 which is a harness provided exclusively for the starter. The minus-side terminal 4b of battery 4 and a minus-side terminal of the starter 6 may be connected together by a harness not shown, or may be grounded to the vehicle body. The starter harness 7 extends downwards from the plus-side terminal 4a of battery 4, then extends on the vehicle front side of transmission 2, or the side facing the front of the vehicle, and reaches the starter 6. In this way, the starter harness 7 is laid in the engine room. This laying path of the starter harness 7 is so set as to connect the two terminals through a minimum distance, avoiding interference with other components. Moreover, an engine control unit 9 for performing an overall control of engine 1 is disposed at a position adjacent to a strut tower portion 8 of the vehicle body, on the vehicle rear side of the battery 4.

The engine control unit 9 is provided with an idle stop function to stop and restart the engine 1 automatically in conformity with a predetermined condition during operation of the vehicle. For example, the engine control unit 9 is configured to stop engine 1 automatically when the vehicle is stopped at a street crossing, and thereafter to restart the engine 1 promptly through starter 6 automatically when the brake is released and/or the accelerator pedal is depressed to restart the vehicle. The idle stop function per se is known, and detailed explanation is omitted.

Figure 2:
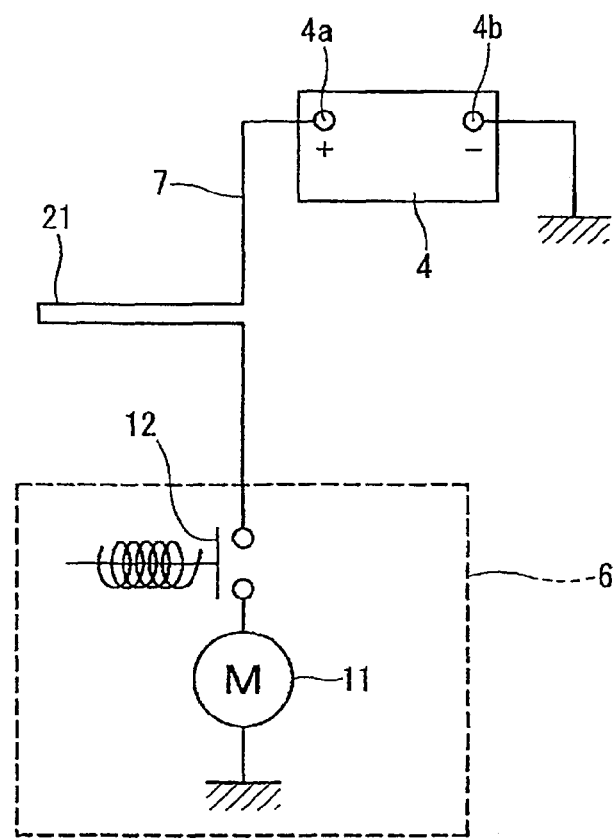
FIG. 2 is a circuit diagram or circuit view of a circuit between a starter and a battery.

FIG. 2 is a circuit view showing the circuit configuration between the starter 6 and battery 4. As is known, the starter 6 includes a starter motor 11 in the form of a dc motor for cranking engine 1 in engagement with an unshown ring gear of engine 1 in the ON state, and a solenoid switch 12 for projecting and retracting a plunger of starter motor 11 and performing an opening and closing operation of energization of a coil. The starter motor 11 and solenoid switch 12 are enclosed in a casing, so that the starter 6 is in the form of a single integral unit.

The starter harness 7 connects the input terminal 6a of starter 6 and the plus-side terminal 4a of battery 4 with each other directly as mentioned before. Starter harness 7 according to the present invention includes a redundant segment 21 which is arranged to increase the resistance, and which is provided in a part of the starter harness 7. With the redundant segment 21, the overall length of starter harness 7 is made longer than the length required for laying the starter harness in the engine room.

The harness 7 includes a cable having a standard construction in which many fine copper wires are collected as conductor, and its outer circumference is coated with an insulating layer of insulator such as vinyl chloride. The conductor employed by the harness is not too thick, and the cross sectional area of the conductor is equal to or slightly smaller than 15 mm$^2$, for example, so as not to make the resistance per unit length too small. To both ends of harness 7, terminals 10 (cf. FIG. 4) of copper plate are attached preliminarily.

Figure 3:
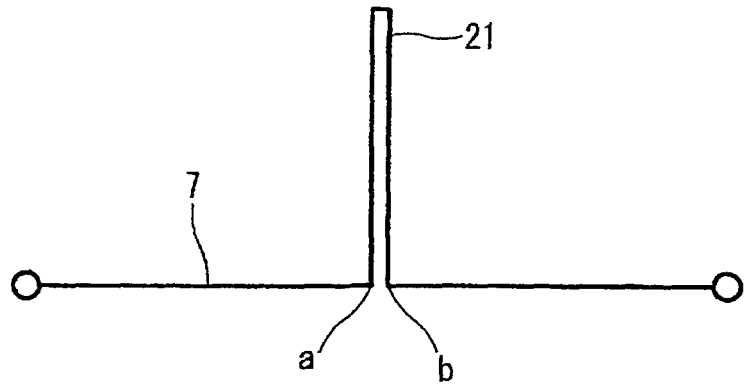
FIG. 3 is a view showing, as an example, layout of a redundant segment.
Figure 3:
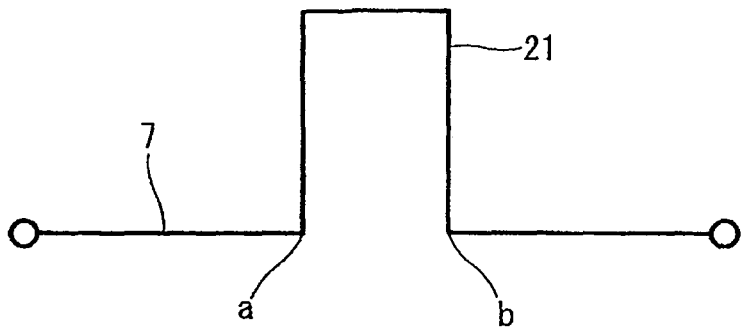
Figure 3:
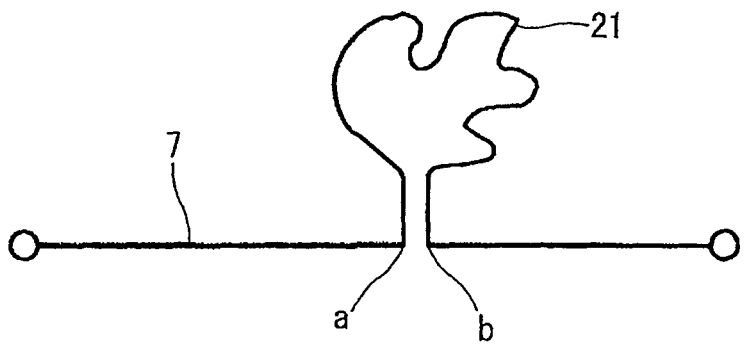

As shown in FIG. 3(a), as an example, the redundant segment 21 is formed by pulling out a part of the harness 7 in the form of a single continuous line, extending along a laying path of harness 7, laterally to one side out of the harness laying path at a point "a", folding back approximately in the U shape, and returning the harness 7 of the redundant segment 21 to a point "b" on the original harness laying path. It is not always necessary to place the point "a" and point "b" adjacent to each other physically. It is optional to separate the points "a" and "b" more or less as shown in FIG. 3(b). Moreover, as shown in FIG. 3(c), as an example, it is possible to arrange or lump the redundant segment 21 in an appropriate form and to dispose the redundant segment 21 in a surplus or remaining space in the engine room.

Figure 4:
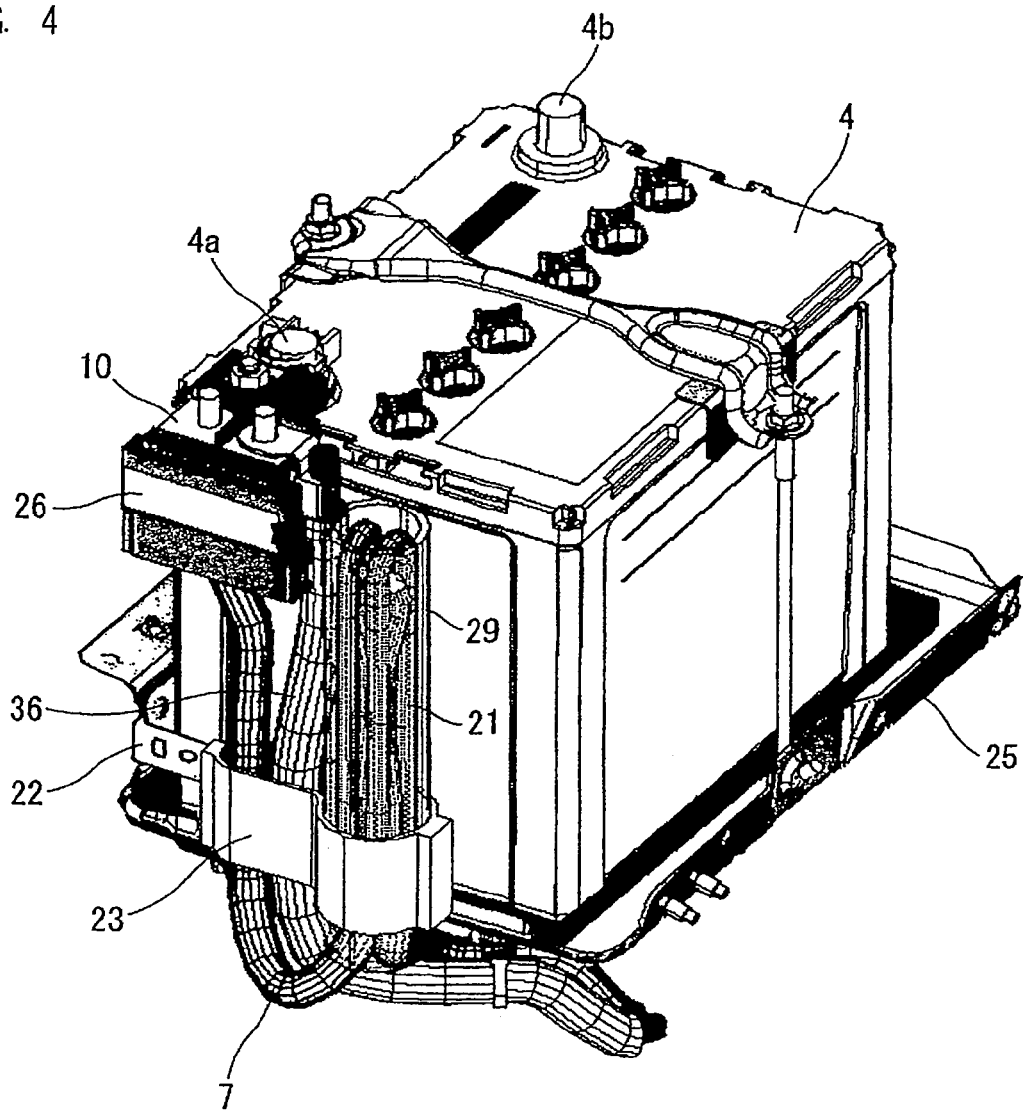
FIG. 4 is a perspective view showing a practical example in which the redundant segment is supported on a battery tray.

In the embodiment shown in FIG. 1, as shown in detail in FIG. 4, the redundant segment 21 is formed by further folding a twofold segment formed by folding back the harness 7, twice in the same direction and thereby arranged in a shape of a rod. The rod-shaped redundant segment 21 is fixedly supported on the battery tray 25 through a later-mentioned bracket 22 and a later-mentioned harness holder 23 made of a synthetic resin at such a position that the rod-shaped redundant segment 21 stands upright along a side surface of the box-shaped battery 4 (concretely, along one of the ends surfaces spaced in a longitudinal direction, near the plus-side terminal 4a).

The terminal 10 of harness 7 on a base side is connected through a collecting connector 26, with the plus-side terminal 4a of battery 4. The harness 7 extends downwards from the collecting connector 26, turns upwards so as to form a U-shaped turn, at a level near battery tray 25, and reaches the rod-shaped redundant segment 21. Then, the harness 7 further extends downwards from the lower end of the rod-shaped redundant segment 21, and extends to the starter 6, as mentioned before.

Figure 5:
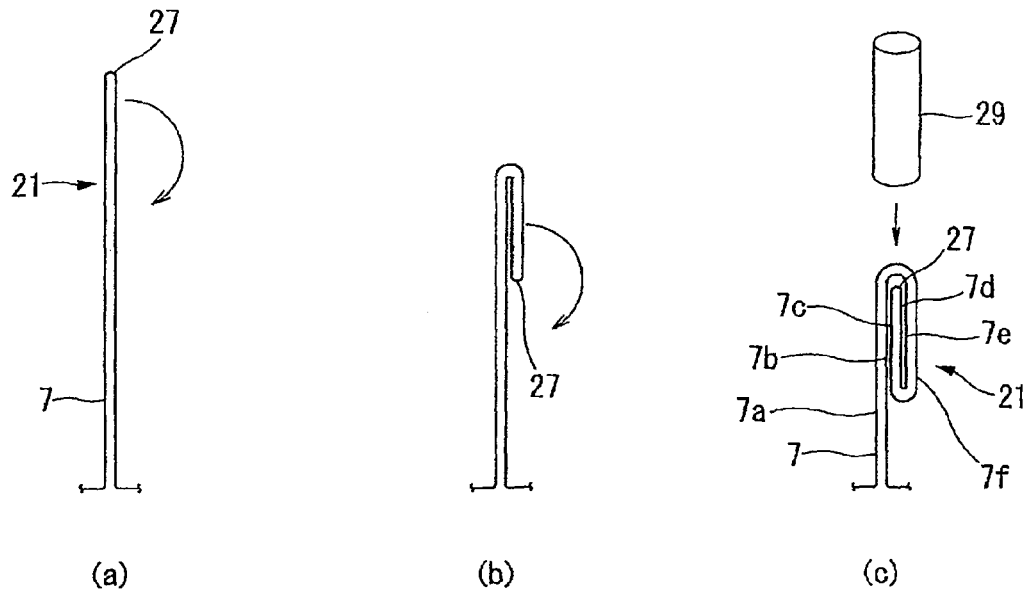
FIG. 5 is a view illustrating a folding method of the redundant segment.

FIG. 5 illustrates a folding method for forming the redundant segment 21. A forward end portion including a forward end 27 of the twofold segment of harness 7 as shown in FIG. 5(a) is folded as shown in FIG. 5(b), and the segment of harness 7 is folded once more in the same direction so that the initial forward end 27 is placed inside, as shown in FIG. 5(c). Therefore, in the portion bunched as shown in FIG. 5(c), six harness segments 7a, 7b, 7c, 7d, 7e and 7f extend side by side adjacently with one another. Though harness 7 has a flexibility, in dependence on the thickness of the conductor, the harness 7 is sufficiently rigid to retain the folded shape. In the bunched or folded portion as the redundant segment 21, the harness 7 is further coated with a known a glass varnish braid tube or sleeving (not shown) on the outer circumferential side of the coating layer of the insulating material such as vinyl chloride so as to improve the insulating property and heat resisting property between adjacent wires.

The redundant segment 21 formed by folding a part of the harness a plurality of times as mentioned before is finally inserted into a tube 29 which is relatively flexible and which is made of a synthetic resin such as vinyl chloride, and the rod-shaped redundant segment 21 is enclosed and covered entirely by this tube 29. The harness 7 simply bent is urged to expand in tube 29, and therefore, the tube 29 is held around the redundant segment 21. It is optional to bind insulating adhesive tape around the tube 29 tightly according to the need. Furthermore, it is desirable to close an opening at a forward end of tube 29, with insulating adhesive tape. Alternatively, it is optional to use the tube 29 which is preliminary closed and sealed at one end. FIG. 4 shows the tube 29 by imaginary lines, and depicts the structure of redundant segment 21 inside the tube 29 in a see-through image.

In one concrete practical example, the rod-shaped bundled portion is about 15 cm~20 cm long in accordance with the height of battery 4. With the before-mentioned six-fold segment, the starter harness 7 additionally includes the redundant segment 21 having a length of about 1 meter as the harness length. The length of harness in the original laying path excepting the redundant segment 21 is about 1 meter, for example. Therefore, in this example, the total length of harness 7 is about 2 meters, and namely, the harness 7 is approximately two times longer than the original laying path of harness 7. With this configuration, the resistance of harness 7 as a whole is set equal to about 2 mΩ. Therefore, the harness 7 can mitigate the voltage drop due to the inrush current by an amount of about 1~2V as compared to a harness having a harness length equaling 1 m and a resistance equaling 1 mΩ.

Figure 6:
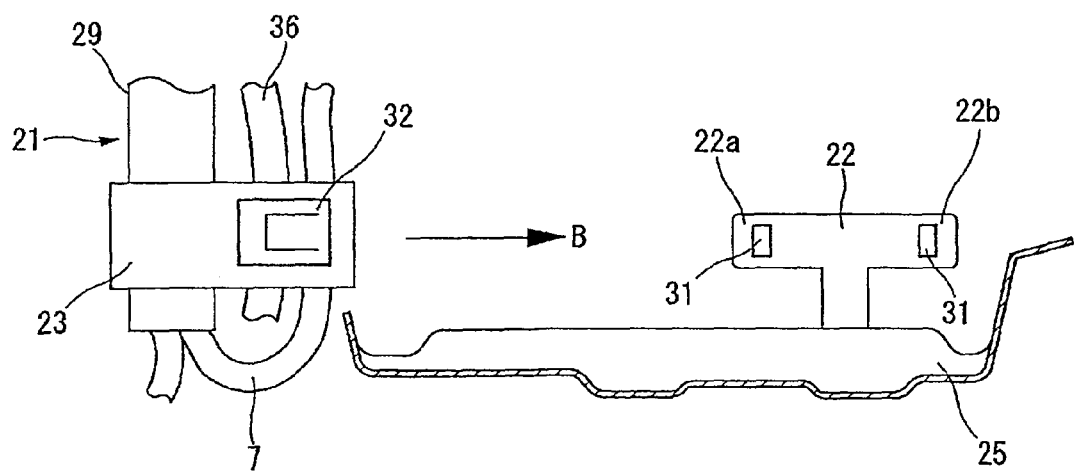
FIG. 6 is an exploded view showing a bracket of the battery tray and a harness holder.
Figure 7:
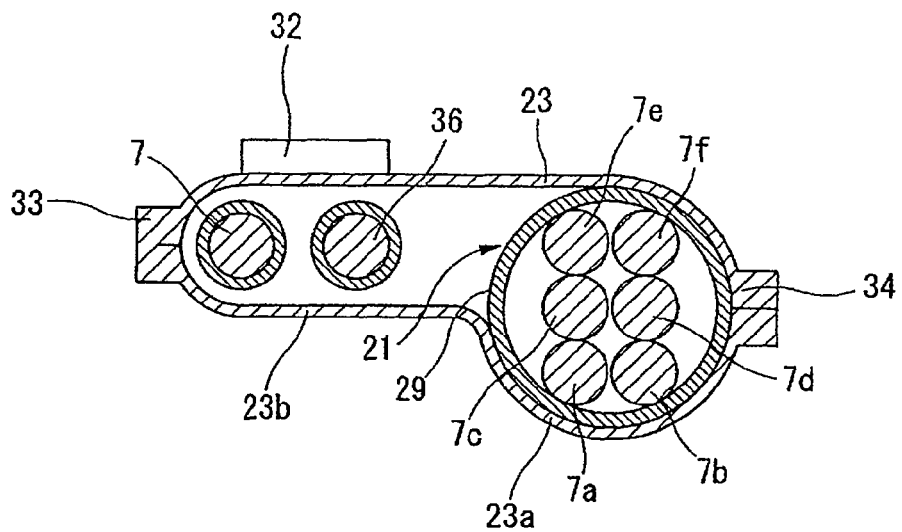
FIG. 7 is a sectional view taken across a line A-A in FIG. 6.

FIG. 6 and FIG. 7 show an attaching or fastening structure of the redundant segment 21 to battery tray 25. As shown in FIG. 6, the battery tray 25 is in the form of a shallow pan formed by press forming of steel sheet in conformity with the shape of the bottom of battery 4. Battery tray 25 includes the bracket 22 formed integrally with battery tray 25. Bracket 22 extends upwards from one side edge of battery tray 25 and has a T-shaped form. Each of left and right arms 22a and 22b of T-shaped bracket 22 is formed with an engagement hole 31. A slit portion (not shown) of a mounting portion 32 (cf. FIG. 7) of a rear portion of the harness holder 23 is inserted to the first arm 22a of the bracket 22 as shown by an arrow B in FIG. 6, and engaged with the engagement hole 31 to prevent extraction. The second arm 22b of bracket 22 is engaged with another harness holder (not shown) for holding another harness etc.

The harness holder 23 is an integral unit formed of a synthetic resin, and is relatively rigid. As shown in FIG. 7, harness holder 23 is in a form cut in two and includes two arms connected by a hinge portion 33 so that the two arms can open and close. At an engaging portion 34 at the other end, the two arms are engaged with each other by the use of elastic deformation of the resin. Harness holder 23 includes a circular portion 23a having a relatively large diameter in a cross sectional shape, and a U-shaped portion 23b connected continuously with the circular portion 23a. The redundant segment 21 arranged in the rod shape is fit and held in the circular portion 23a. The U-shaped portion 23b encloses the base end side portion of harness 7 and another power supply harness 36 which are fixed side by side in the U-shaped portion 23b.

The thus-constructed embodiment is arranged to ensure the required resistance with the length of starter harness 7 without using another resistor, so that no limitation of the heat resistance of an ordinary resistor is imposed.

The required resistance is achieved by increasing the total length of harness 7 redundantly, instead of increasing the resistance per unit length of harness 7 (reducing the cross sectional area of the conductor or changing the conductive material, for example). Therefore, when current of a certain magnitude flows, it is possible to reduce the quantity of heat generated per unit length of harness 7. Moreover, it is possible to set the conductor cross sectional area greater when the material of the conductor is the same. Therefore, the heat mass of the conductor is made greater, and the harness 7 is not heated to an excessively high temperature in the engine room.

In the above-mentioned embodiment, the rod-shaped redundant segment 21 is fixedly supported on the battery tray 25 and disposed in the upright posture extending vertically along the side surface of battery 4. Therefore, the space in the engine room can be utilized effectively in a three-dimensional manner; no or little space is wasted by the redundant segment 21, there is no possibility of the elongated harness 7 being obstructive to operations such as maintenance operation; and the battery 4 can be replaced in a usual manner.

The redundant segment 21 collected compactly in the form of a rod by folding a plurality of times as mentioned before is not only advantageous in ease of treatment at the time of installation, but advantageous in restraining the generation of magnetic field forming noise, as well. If a surplus segment of the harness 7 is wound in a circle or in the form of a coil, the surplus harness segment generates magnetic field by the flow of current. However, in the folding arrangement as shown in FIG. 5(c), the six harness segments 7a, 7b, 7c, 7d, 7e and 7f produce magnetic fields in opposite directions, so that the magnetic fields are canceled one another and the noise leaked outside is made very small.

As evident from the layout of FIG. 1, the rod-shaped redundant segment 21 is placed at the position behind battery 4 or shadowed by battery 4, as viewed from engine control unit 9. Therefore, the battery 4 in the form of the lead battery can serve as a kind of electromagnetic shield, and reduce the influence of noise to the engine control unit 9.

Although one embodiment of the invention has been described above, the invention is not limited to the embodiment described above. Various modifications and variations are possible. For example, it is not always necessary to construct the redundant segment 21 in the form folded in the shape of a rod. It is possible to form the redundant segment 21 in an appropriately rounded shape, and to dispose the redundant segment 21 in a space on the lower side of the battery tray 25 or in a space above the battery 4. Moreover, it is possible to provide the surplus redundant segment 21 in an appropriate shape in a portion near the starter 6 instead of the portion near the battery 4.

The invention claimed is:

1. An engine starting apparatus for an idle-stop vehicle provided with an idle-stop function to stop an engine and to restart the engine through a starter automatically in conformity with a predetermined condition, the engine starting apparatus comprising a starter harness laid to connect an terminal of an in-vehicle battery and the starter directly, the starter harness including a redundant segment increasing a resistance, a total length of the starter harness being made longer, by providing the redundant segment in the starter harness than a harness length required for laying the starter harness, the redundant segment being put together in a collected form by folding back a portion of the starter harness extending continuously in a single line.

2. The engine starting apparatus for the idle-stop vehicle, as recited in claim 1, wherein the redundant segment is disposed in a space around the battery or a space adjacent to the battery on an upper side or a lower side.

3. The engine starting apparatus for the idle-stop vehicle, as recited in claim 1, wherein the redundant segment is put together in a form of a rod, by further folding a two-fold portion of the harness once or a plurality of times.

4. The engine starting apparatus for the idle-stop vehicle, as recited in claim 3, wherein the redundant segment put together in the form of the rod is fixed through a bracket to a battery tray in a position extending along a side surface of the battery.

5. The engine starting apparatus for the idle-stop vehicle, as recited in claim 3, wherein the redundant segment is provided a tube of a synthetic resin covering an outer circumference of a whole of the redundant segment put together in the form of the rod.

6. The engine starting apparatus for the idle-stop vehicle, as recited in claim 1, wherein the redundant segment is provided with a glass varnish braid tube provided on an outer circumference of an insulating layer of the harness.

7. The engine starting apparatus for the idle-stop vehicle, as recited in claim 1, wherein the redundant segment is located at a position behind the battery as viewed from an engine control unit.

8. The engine starting apparatus for the idle-stop vehicle, as recited in claim 2, wherein the redundant segment is put together in a form of a rod, by further folding a two-fold portion of the harness once or a plurality of times.

9. The engine starting apparatus for the idle-stop vehicle, as recited in claim 4, wherein the redundant segment is provided with a tube of a synthetic resin covering an outer circumference of a whole of the redundant segment put together in the form of the rod.

\* \* \* \* \*